US012793501B2

(12) United States Patent
LeStrange et al.

(10) Patent No.: US 12,793,501 B2
(45) Date of Patent: Nov. 10, 2026

(54) METHOD AND SYSTEM FOR CENTRALIZING PATRON REGISTRATION AND NORMALIZING PATRON DATA RELATIVE TO DISPARATE CASINO SYSTEMS

(71) Applicant: Everi Payments Inc., Austin, TX (US)

(72) Inventors: Michael LeStrange, Henderson, NV (US); Abid Hussain, Farmington Hills, MI (US); Brandon Ryan, Las Vegas, NV (US); Vinoth Subramanian, Las Vegas, NV (US); Michael Ehlers, Las Vegas, NV (US); Joseph Geli, Las Vegas, NV (US); Jeff Patyk, Detroit, MI (US)

(73) Assignee: Everi Payments Inc., Las Vegas, NV (US)

( * ) Notice: Subject to any disclaimer, the term of this patent is extended or adjusted under 35 U.S.C. 154(b) by 439 days.

(21) Appl. No.: 18/377,935

(22) Filed: Oct. 9, 2023

(65) Prior Publication Data

US 2024/0144774 A1 May 2, 2024

Related U.S. Application Data

(60) Provisional application No. 63/414,695, filed on Oct. 10, 2022.

(51) Int. Cl.
*G07F 17/32* (2006.01)
*G06Q 20/36* (2012.01)
*G06Q 30/0226* (2023.01)

(52) U.S. Cl.
CPC ......... *G07F 17/3237* (2013.01); *G06Q 20/36* (2013.01); *G07F 17/3255* (2013.01); *G06Q 30/0226* (2013.01)

(58) Field of Classification Search
CPC ............ G07F 17/3237; G07F 17/3255; G06Q 30/0226
See application file for complete search history.

(56) References Cited

U.S. PATENT DOCUMENTS

2002/0086727 A1* 7/2002 Soltys ................ G06K 7/10722 273/274
2016/0225225 A1* 8/2016 Sanford .............. G07F 17/3241

* cited by examiner

*Primary Examiner* — Jasson H Yoo
(74) *Attorney, Agent, or Firm* — Sheridan Ross P.C.

(57) ABSTRACT

Methods and systems are provided for facilitating the registration or enrollment of a gambling patron into multiple gaming or casino-related systems, and for retrieving information about a patron from one or more gaming systems and normalizing the patron information for easy use across such systems. The system may include a patron gateway service which serves as an interface between different ones of the casino-related systems, such as to exchange patron related information.

22 Claims, 5 Drawing Sheets

Wallet Linking

METHOD AND SYSTEM FOR CENTRALIZING PATRON REGISTRATION AND NORMALIZING PATRON DATA RELATIVE TO DISPARATE CASINO SYSTEMS

RELATED APPLICATION DATA

This application claims priority to U.S. Provisional Application Ser. No. 63/414,695, filed Oct. 10, 2022, which application is incorporated by reference in its entirety herein.

FIELD OF THE INVENTION

The present invention relates to gaming systems such as those used by casinos and online game operators.

BACKGROUND OF THE INVENTION

Casinos are highly specialized and complex environments, due at least in part because they are highly regulated. A casino may operate a large number of electronic systems that may be located at the casino or elsewhere, and be operated by the casino or third party vendors. These systems include, but are not limited to: Casino Management Systems ("CMS"), gaming management systems, digital gaming platform(s) ("DGP"), loyalty systems, mobile gaming applications, Financial Payment Systems ("FPS"), compliance and CTR systems ("CTR"), employee assisted applications, Identity Management Systems ("IAM"), Gaming Credit systems and others.

Each of these systems may contain some shared information, where the depth and type of information may vary greatly across these systems. For example, different systems may contain information about a patron, gaming transactions or other events. However, it is often necessary for the systems to exchange information, or for the casino to reconcile the information or data from different systems with one another.

However, each casino system may offer its own application program interface ("API") and interfaces specific to that casino system. Because there is lack of uniformity across these interfaces the casino operator and their system suppliers/vendors may struggle to develop and maintain different integrations for each. Yet minimum interoperability must exist between these casino systems in order to efficiently run the casino. In addition, critical system suppliers often make periodic updates to their proprietary interfaces which has a rippling cost effect as other gaming related systems in the operator's enterprise which have implemented the critical system's proprietary interfaces may require new development or, at minimum, may need to be re-tested and recertified.

The present invention comprises a technical solution to these and other problems associated with such electronic casino systems.

SUMMARY OF THE INVENTION

Aspects of the invention comprise methods and systems that facilitate the registration or enrollment of a gambling patron into multiple gaming or casino systems, and methods and systems for retrieving information about a patron from one or more gaming or casino systems and normalizing the patron information for easy use across such systems.

In one embodiment of the invention, a patron gateway service is communicatively coupled with one or more gaming or casino services, such as via normalized APIs, whereby the patron gateway service may serve as a gateway or proxy agent between such systems, including to allow the exchange of information therebetween.

Further objects, features, and advantages of the present invention over the prior art will become apparent from the detailed description of the drawings which follows, when considered with the attached figures.

DETAILED DESCRIPTION OF THE INVENTION

Figure 1:
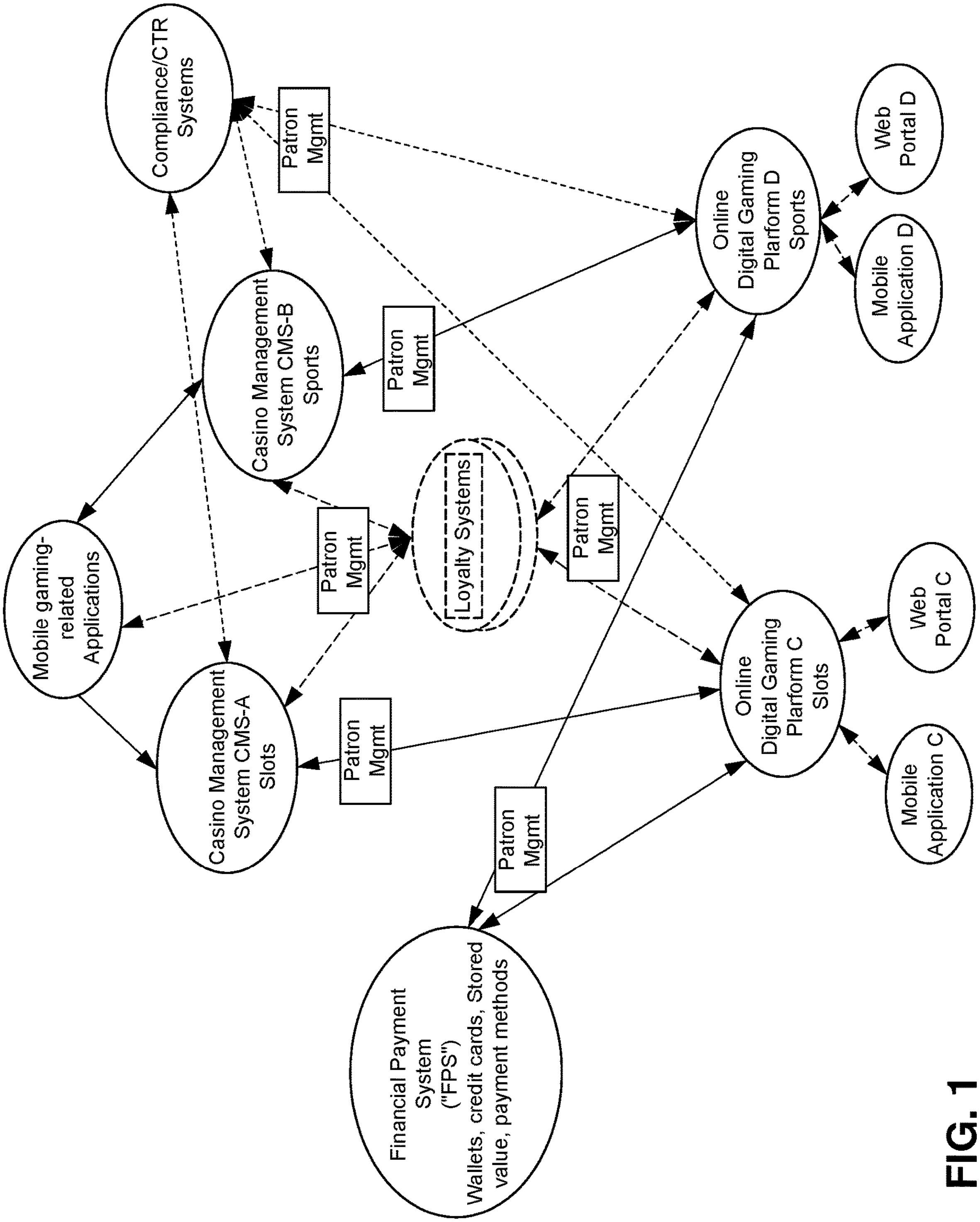
FIG. 1 schematically illustrates integrated patron management in gaming related systems in accordance with the present invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Aspects of the invention comprise methods and systems that facilitate the registration or enrollment of a gambling patron into multiple gaming or casino systems, and methods and systems for retrieving information about a patron from one or more gaming systems and normalizing the patron information for easy use across systems.

In one embodiment, a Patron Gateway Service ("PGS") is communicatively coupled to one or more casino systems and acts as a gateway or proxy agent, such as to facilitate patron enrollment in one or more of the systems by retrieving information from one system for use by another system in such enrollment process, and/or to create and/or link patron loyalty and financial accounts of various systems.

In one embodiment, patron enrollment in one casino or gaming system is facilitated by the PGS which obtains patron information from another casino or gaming system. As one example, patron enrollment in a casino online gaming system is facilitated by the PGS, which obtains patron information from another casino or gaming system, such as a casino management system and which provides that information to the casino online gaming system for use in the enrollment process.

In another embodiment, patron enrollment in one casino or gaming system is facilitated by the PGS which links the enrollment to an existing patron account. As one example, patron enrollment in a casino online gaming system is facilitated by the PGS, which searches one or more other casino or gaming systems for existing accounts of the patrons and, when located, links an existing account to the casino online gaming system.

In yet another embodiment, patron enrollment in a casino or gaming system is performed by the PGS, which may act as a proxy to perform the enrollment process for the system.

Overview

A gaming patron (which may also be referred to as a customer or player, and can pertain to a land-based casino patron and/or an on-line casino gaming patron) can register or enroll for accounts in gaming or casino related systems utilized by a gaming operator (as indicated herein, the gaming operator, which may also be referred to as a casino operator, may operate or offer land-based gaming, such as at physical slot machines, tables and the like, or on-line or digital gaming, such as via one or more computing devices such as computers, phones, etc.). A patron can self-register on a variety of touchpoints such as, but not limited to: a mobile gaming application, a web site, a loyalty kiosk, a financial kiosk and other self-service touchpoints. In addition, the gaming operator may utilize applications which allow a casino employee to assist the patron across functional areas. Assisted applications may be used for enrollment of patrons into casino management systems, support the operator's employees in assisting patrons in call centers and patron support functions in; casino cages, hotel front desks, and in employee operated mobile applications used for taxable win event processing or CTR systems, etc.

In one embodiment of the invention, a casino system is modified in accordance with the invention to include the PGS. The above-referenced touchpoints and applications may interface to the PGS (as may a variety of casino systems, as detailed below).

In one embodiment, the PGS may implement functionality such as, but not limited to: discovering if the patron already has accounts in various systems within the enterprise, retrieving information about the patron from various systems within the enterprise, facilitating the enrollment of the patron in multiple systems, retrieving loyalty related information about the patron such as offers and point balances and provide updates to the patron's information and loyalty related information.

In one embodiment, the PGS may be implemented as software stored in a memory and executed by a processor of a server or other computing device (where such a device may comprise a dedicated device or may comprise a server which implements other functionality, such as by implementing other casino or gaming systems as described below). Such a server may comprise one or more processors or controllers, at least one communication device or interface, a database or other data storage device, and one or more additional memory or data storage devices (such as separate from the database). In one or more embodiments, the processor(s) is configured to execute one or more instructions, such as in the form of machine readable code (i.e. "software"), to allow the server to perform various functionality, such as the functionality described herein. The software is preferably non-transitory, such as by being fixed in a tangible medium. For example, the software may be stored in the one or more memory devices. One or more of the memory devices may be read-only. In addition, the software may be stored on a removable medium in some embodiments. In general, the one or more memory devices are used as temporary storage. For example, the one or more memory devices may be random access memory or cache memory used to temporarily store some user information and/or instructions for execution by the at least one processor.

The software may comprise one or more modules or blocks of machine-readable code. Each module may be configured to implement particular functionality when executed by the one or more processors, and the various modules may work together to provide overall integrated functionality. Of course, in certain embodiments, it is also possible for various of the functionality to be implemented as hardware, i.e. a processor or chip which is particularly designed to implement various of the functionality described herein.

In one embodiment, the server which implements the PGS may include (or be linked communicatively at one or more times to) one or more input and/or output devices, such as a keyboard, mouse, touchscreen, video display or the like, whereby the processor may receive information from an operator or servicer of the server and/or output information thereto. This allows, for example, an operator of the server to interface with the server to upgrade, maintain, monitor, etc., it. In other embodiments, an operator might interface with the server via a separate workstation or other device.

In one embodiment, the processor and other elements of the server may be linked and thus communicate over one or more communication buses. In this manner, for example, the processor may read/receive software from the memory for execution, receive inputs and provide outputs to the various I/O devices, receive information from or output information to external devices via the communication interface, etc. The one or more communication devices or interfaces permit the server to communicate with other servers, systems and the like, as described herein. In particular, in one embodiment, the PGS is configurable to communicate with a diversity of casino or gaming systems (where such systems are referred to as casino or gaming systems because they relate to the operation of land-based or on-line gaming or casinos which offer gaming—such as wager based gaming, where it is understood that such systems may be located at the casino or elsewhere, and be operated by the casino or third party vendors or the like).

As indicated above and as illustrated in FIG. 1, such systems may include, but are not limited to: Casino Management Systems which may enable management of brick-and-mortar casino gaming systems including physical gaming machines, gaming tables and the like, an associated information including that relating to accounting, patron loyalty, etc. ("CMS"), gaming management systems, digital gaming platform(s) ("DGP"), separate or secondary loyalty systems, mobile gaming applications, Financial Payment Systems ("FPS"), compliance and CTR systems ("CTR"), employee assisted applications, Identity Management Systems ("IAM"), Taxable Win Event systems ("TWE"), Gaming Credit systems, etc. Each of these systems may contain some shared information about a patron, where the depth and type of information may vary greatly across these systems. However, as illustrated in FIG. 1, an aspect of the invention is the desired ability to share or exchange patron information between these different systems.

Each casino system may offer its own application program interface ("API") and interfaces specific to that casino system. Because there is lack of uniformity across these interfaces the casino operator and their system suppliers/vendors may struggle to develop and maintain different integrations for each. Yet minimum interoperability must exist between these casino systems in order to efficiently run a gaming business. It is the intent of this invention to provide shared access to key patron information across these related systems within the gaming operator's enterprise. For example, there are cases where the operator may wish to send a patron an email or mobile phone message. If the patron has provided different email addresses or perhaps even differing mobile phone numbers to various of the casino systems, the casino operator will typically not be able to easily discover the potential variations in contact info given by the patron. It is an intent of this invention to handle such variations of patron information across disparate system (such as to normalize the same or creation cross-links between the same) so that use of the information, including messaging to patrons, is consistent and well-orchestrated both to suit an operator's needs and meet a patron's preferences.

Figure 2:
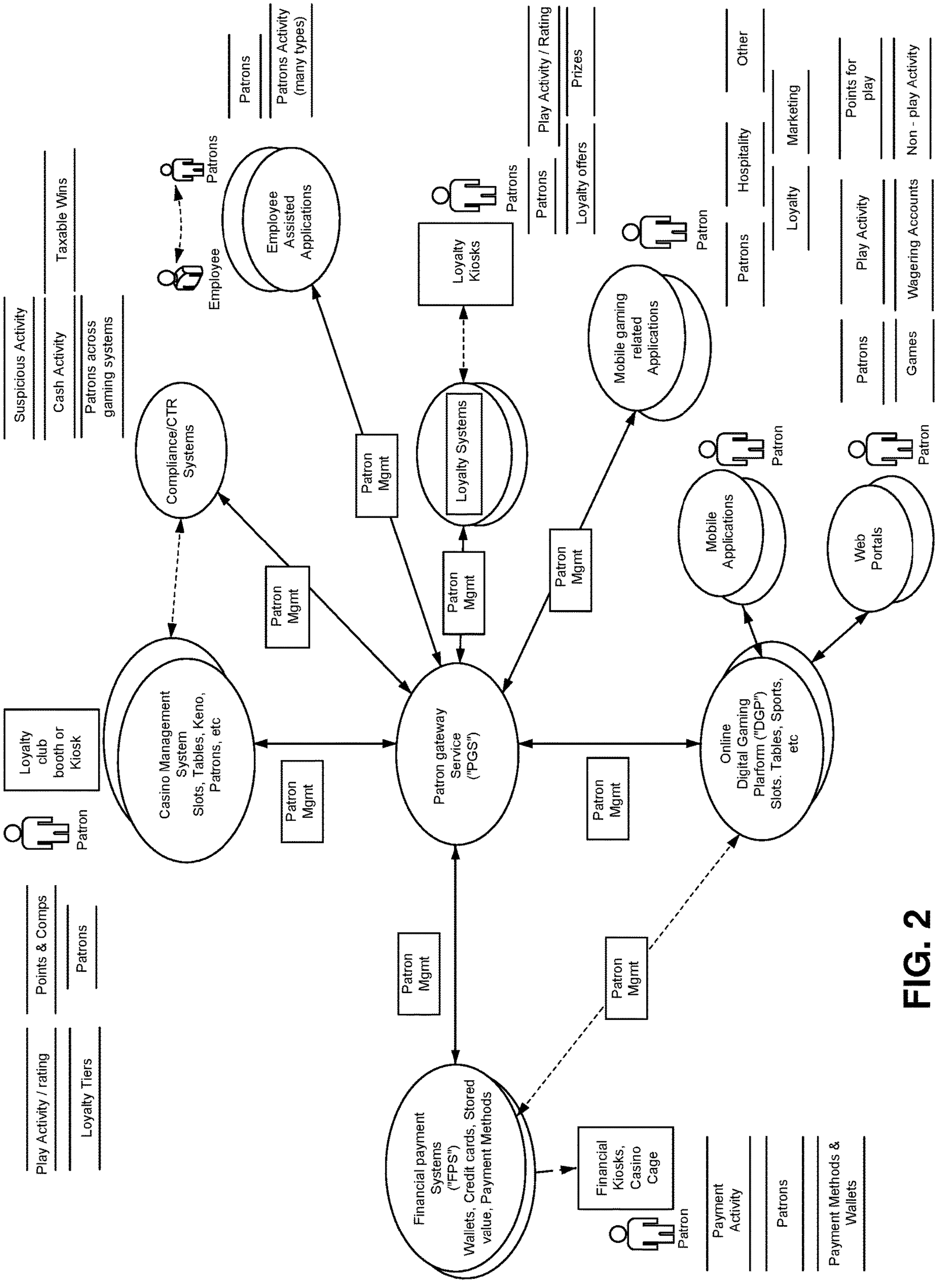
FIG. 2 schematically illustrates aspects of patron management integration in gaming related systems in accordance with the present invention.

Accordingly, in accordance with one embodiment of the invention, a PGS is provided. The PGS is preferably interposed (at least communicatively) between a plurality of different casino systems, such as illustrated in FIG. 2 (wherein in FIG. 2, system or applications are displayed in ovals, open ended bars represent data stores, and boxes represent different types of data content).

In one embodiment, the PGS provides normalized APIs that can be consumed by any number of the operator's casino systems. In one embodiment, the PGS stores, such as in a memory associated with a processor thereof, the one or more APIs or other interfaces for each particular system. The PGS then utilizes those different APIs or interfaces in order to facilitate communications with those different systems, such as via the one or more communication interfaces with those systems. For example, the PGS may utilize a first API to communicate with a financial payment system FPS, a second API to communicate with a casino management system CMS, a third API to communicate with a digital gaming platform DGP, etc. In such a configuration, communication between two systems (such as a CMS and DPG) is facilitated by the PGS's use of the first and third APIs in this example.

Relative to accessing and utilizing patron information which is associated with the different casino-related system, having straight forward API access to fundamental patron information gathered from across diverse applications the patron experience becomes more meaningful. The user experience of the patron may be tailored based on knowing which casino systems they are enrolled in and what activity they may have recently performed within each. For example, an application might prominently present directed promotional context if the patron were known to be enrolled or registered in a financial payment account.

Adoption of the PGS APIs reduces costs for both the gaming system provider/vendor and the gaming/casino operator by offering a common interface for integration between a newly adopted system and pre-existing systems within a gaming enterprise. Without the benefit of this common interface each newly adopted system would need to develop interfaces to one or more existing systems in gaming enterprise.

For most critical operational systems, such as a CMS, proprietary APIs or interfaces are made available by the system provider. In some cases these interfaces may include database queries which are also proprietary. The proprietary interfaces provided are often the only supported means available for communication between other gaming related systems within the operator's enterprise. This invention provides interoperability for these other gaming related systems by having implemented the proprietary interfaces of the critical systems and exposing a normalized functionality via the PGS's APIs. Thus the gaming related systems can have common access methods to critical operational systems, such a CMS. This provides a number of important benefits; when a new gaming related systems is adopted the software developers can quickly develop to the well-known and normalized PGS API provided by this invention versus requiring the developers for the new gaming system to learn and develop to the proprietary API of the critical operational system(s).

In accordance with the invention, the PGS endeavors to maintain an up-to-date implementation of the critical system's proprietary interface whenever the critical system provider extends or modifies the functionality of their interface. This tends to better insulate gaming related systems using the PGS API from the recurrent development costs of adapting to interface additions and changes made by the critical systems providers. The value of this invention is further highlighted when an operator makes a decision to replace one of their critical systems, a CMS for example, with a new competing product. In this case the operator's transition to the new replacement product typically requires the operator's related gaming systems to be modified to support its new product's differing proprietary interfaces. When the PGS of this invention is deployed the development costs and schedule of replacement is materially reduced or possibly eliminated since the PGS interface adopted by the operator's gaming related systems would present nearly identically for both the current and new CMS. In this regard, one aspect of the invention is that the PGS acts as a universal hub that communicates with a plurality of systems and allows communications between those systems. This eliminates the need for each of the systems to independently be configured with communications capability to each other system which, as noted above, would require numerous different APIs or interfaces, modifications to those APIs or interfaces when other systems are updated or when new systems are added. Instead, when a particular system is updated or added, only the PGS needs to be updated in order to allow all of the existing systems to communicate with that updated or new system.

PGS Assist—Registration/Enrollment Overview

One aspect of the invention is integrated and streamlined patron registration or enrollment relative to one or more of the operator's gaming systems. In one embodiment, such registration or enrollment is enabled via the PGS.

Consider the case where a patron desires to register for an online gaming platform (DGP) offered by a gaming operator. Registration for such a system may allow a patron to participate in online gaming. The DGP gaming system may be intended for gambling use while the patron is physically in the casino, for example, presenting games such as Bingo or Keno. Alternately, the DGP gaming systems may also be used outside the physical casino in those jurisdictions where forms of internet wagering are permitted, for example sports betting and slot games.

As is known, such registration generally requires an orchestrated sequence of steps: the patron being prompted to accept terms and conditions and privacy policies, the patron's email or mobile phone must be authenticated, descriptive information must be input by the patron, the preferred patron management system of the casino is queried for the patron's existence and their eligibility status. Assuming the patron exists in the operator's preferred patron management system and is of an eligible status, then the patron will generally enter their driver's license information or information from an acceptable identifying document. Using the information provided by the patron, an associated financial system may be queried for the patron's account, their eligibility status, and for any stored financial instruments (such as a wallet or other payment method). If the patron is not found in the system, the patron account is created in the financial system. If the patron does not yet have a wallet or payment method in the financial system one is created. Key information collected about the patron during the process is captured in the online gaming system for later operational use.

During the process described above, optional steps may be added to verify the patron's identity. These checks are known as "KYC" checks, which means; "Know Your Customer." In this embodiment, the KYC checks may be performed either by the financial system or the online gaming system.

In accordance with one configuration of the invention, the DGP manages the sequence of steps to register a patron and the PGS assists by providing patron information to the DGP system which actively manages the registration process. In a different embodiment, described later, it will be shown how the PGS itself can actively/directly manage the steps in the registration process.

As indicated above, there is generally an orchestrated sequence of steps to register a patron in any casino system. However, in some cases, certain attributes of the patron, such as their status or eligibility, may prevent completion of the registration process at one of the steps. The present invention preferably also allows a patron to suspend their registration process and later resume it at the point in the process where they suspended it, such as to address issues which are preventing the registration.

PGS Assist—Detail of Registration/Enrollment—Personal Data, Verifications, Policies and ID In one embodiment, a new patron begins the registration process by directing their web browser to a page published by the DGP gaming system (or as otherwise available by one of the endpoints described above). Typically, this page will be a game lobby where a login or registration can be selected and games can be selected for play. However, this page and the pages described here can be any suitable entry page for the gaming system including pages of a mobile application.

Figure 3A:
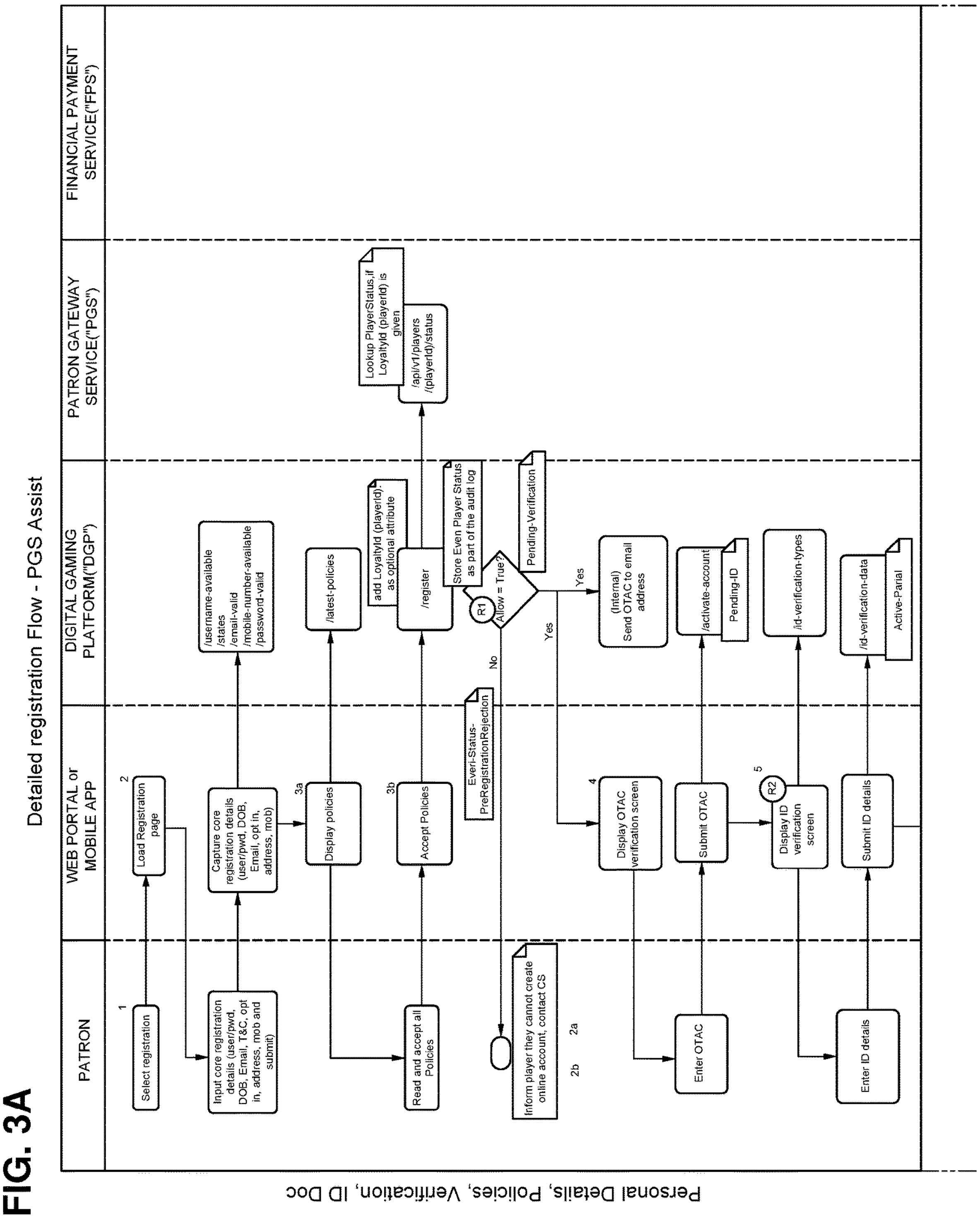
FIGS. 3A, 3B and 3C comprise a flow diagram of a method of the present invention.

The new patron selects the "Register" button to start the registration process and is presented with a page of personal information to enter. (See FIG. 3A at 2). This personal information page will vary depending on the needs of each casino system. For example, in some cases the player tracking card number or patron ID from an on-premises CMS may be pre-provisioned or required to be input by the patron. Alternately the ID may be an enterprise-wide ID for the patron from another source such as a single sign-on service or an enterprise-wide patron database maintained by the gaming operator.

Alternatively, the patron can select the Login button and the Login pop-up will offer a link to start the registration function. (See FIG. 3A at 1).

When the patron enters the requested personal information and submits the page, the DGP will examine the information and check if an account for that patron may already exist. If the creation of a new DGP account would create a potential duplicate account the patron is notified and a new DGP account is not created. (See FIG. 3A at 2*a*).

Next, the DGP retrieves various policies that require patron acceptance such as, but not limited to: "Terms and Conditions", Privacy, Marketing Opt-in, etc. The policies are displayed for the patron and the patron is required to accept as conditions for use of the gaming system. (See FIG. 3A at 3*a*, 3*b*). Provided the patron accepts the policies the DGP may create a new gaming account for the patron at this step.

Should the patron's personal information contain a player tracking card number or patron ID for the on-premises CMS, the DGP may elect to use this ID to get the patron's personal information stored in the CMS via a PGS API of the invention. The retrieval and use of this additional patron information from the CMS is referred to in later steps of the registration process.

A patron may be blocked or banned or locked on the CMS and any of these status would most likely make them ineligible for a DGP account. If the patron is in an ineligible status on the CMS they will not be registered in DGP. (See FIG. 3A at 2*b*).

Once an account has been created for the patron on the DPG, their registration status is set to "Pending Verification." This enables the patron to return to this step in the registration process should they be unable to complete subsequent step(s) of registration. (See FIG. 3A at R1). Next, the patron must verify they control the email address provided in an earlier registration step. (See FIG. 3A at 4). Email is shown here as the verification factor but one skilled in the art will recognize other verification factors are possible, such as mobile phone number, etc.

When the patron successfully completes their email verification, their registration status may be set to "Pending_ID" allowing the patron to return to this step in the registration process should they be unable to complete the next step in the process. (See FIG. 3A at R2).

Additional aspects of the invention will be appreciated from FIGS. 4A-4R which are contained in Appendix A hereto, which are example graphical user interfaces which may be generated and displayed as part of implementation of the invention.

PGS Assist—Detail of Registration/Enrollment—Loyalty System Linking

In one configuration, an additional phase of patron enrollment includes a patron providing information regarding an ID, such as by prompting the patron for information about their ID document. The ID document may comprise a driver's license but can be another types of ID document such as a passport or military ID. (See FIG. 3A at 5). The collected information about the identity document is preferably stored for use in later steps of the registration process.

A combination of personal information entered earlier by the patron is used in an API search query sent from the DGP to the PGS, which then queries one or more of the casino systems for patron information (such as patron accounts). This information typically consists of one or more of patron name, date of birth, address, identity document info, etc. The minimum information may vary depending on the design of the CMS system or other casino system to be queried by the PGS.

In processing the API query, the PGS may heuristically refine the query to minimize the possibility of returning multiple near duplicate account results to the DGP. In response to the search query, assuming a single account is returned to DGP, the patron's registration status is set to "Active-Loyalty-Started", which allows the patron to return to this step in the registration process if they are unable to complete subsequent step(s) of registration. (See FIG. 3A at R4).

The patron's player card number or CMS patron ID may have been available to the registration process during the collection of a patron's personal data. For instance the patron ID could have been known and pre-provisioned to DGP by the mobile app which initiated the DGP registration. In other words, the patron ID would not necessarily need to be collected from the patron at this step, although it could be a visible field of the page and input by the patron. (See FIG. 3A at 2). If the lookup of patron information via PGS can be done via a patron ID lookup versus a query based on several patron fields. The lookup API will preferably not return duplicates. In this case the patron's CMS account is found or an error is signaled.

Figure 3B:
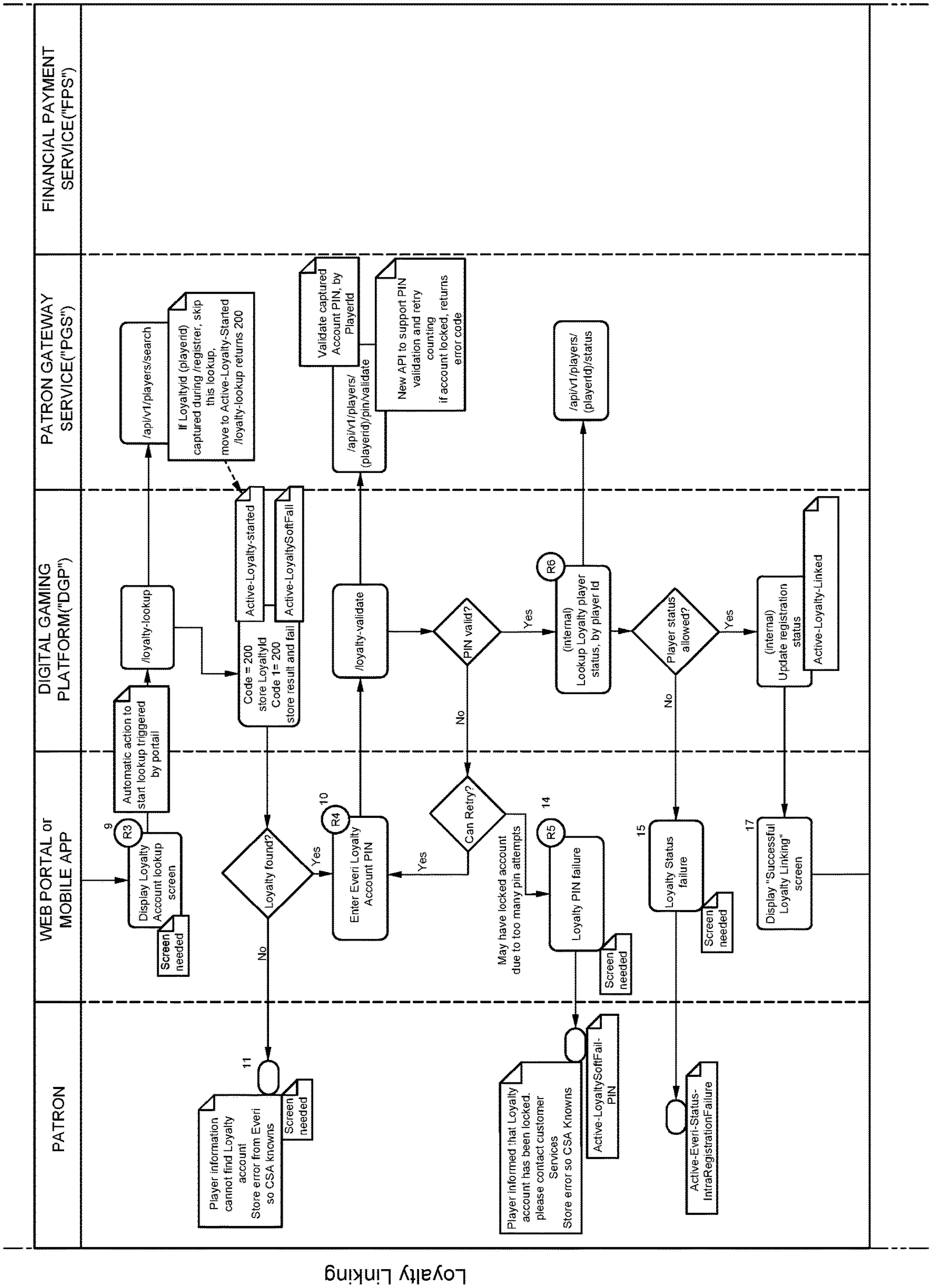

If no CMS patron account was found by the PGS API or search query, or if an error occurred, the patron is informed that their registration cannot be completed at this time. (See FIG. 3B at 11).

If a CMS patron account was found, the registration process may seek additional verification from the patron that they control the CMS patron account. To provide addition verification, the patron may be prompted to enter their CMS PIN. The DGP may use the CMS PIN input by the patron in an API request to the PGS. The PGS makes the appropriate CMS API call to validate the patron entered PIN against the stored PIN in the CMS. The PIN input by the patron is preferably protected within the PGS API request body, such as by well-known encryption practices. (See FIG. 3B at 10).

The registration process may provide for a configurable number of retries for the PIN input in case the patron makes a keying error. The number of retries is dependent on CMS internal rules. For example, too many consecutive failed PIN validations may lock the account on the CMS, thus impacting the patron's eligibility for a DGP account.

If the patron's PIN cannot be validated, the patron is informed and the patron's registration status is set to "Active-LoyaltySoftFail-PIN", this allows the patron to easily resume at this step in the registration process. (See FIG. 3B at R5, 14).

To complete the Loyalty Linking steps of the registration process the DGP once again checks the patron's status via the PGS API call for this purpose. It is necessary to make the check again as the patron's registration process may have been suspended for some prolonged period of time before reaching this step. During the time the registration process was suspended the patron's eligibility status on the CMS could have changed.

Figure 3C:
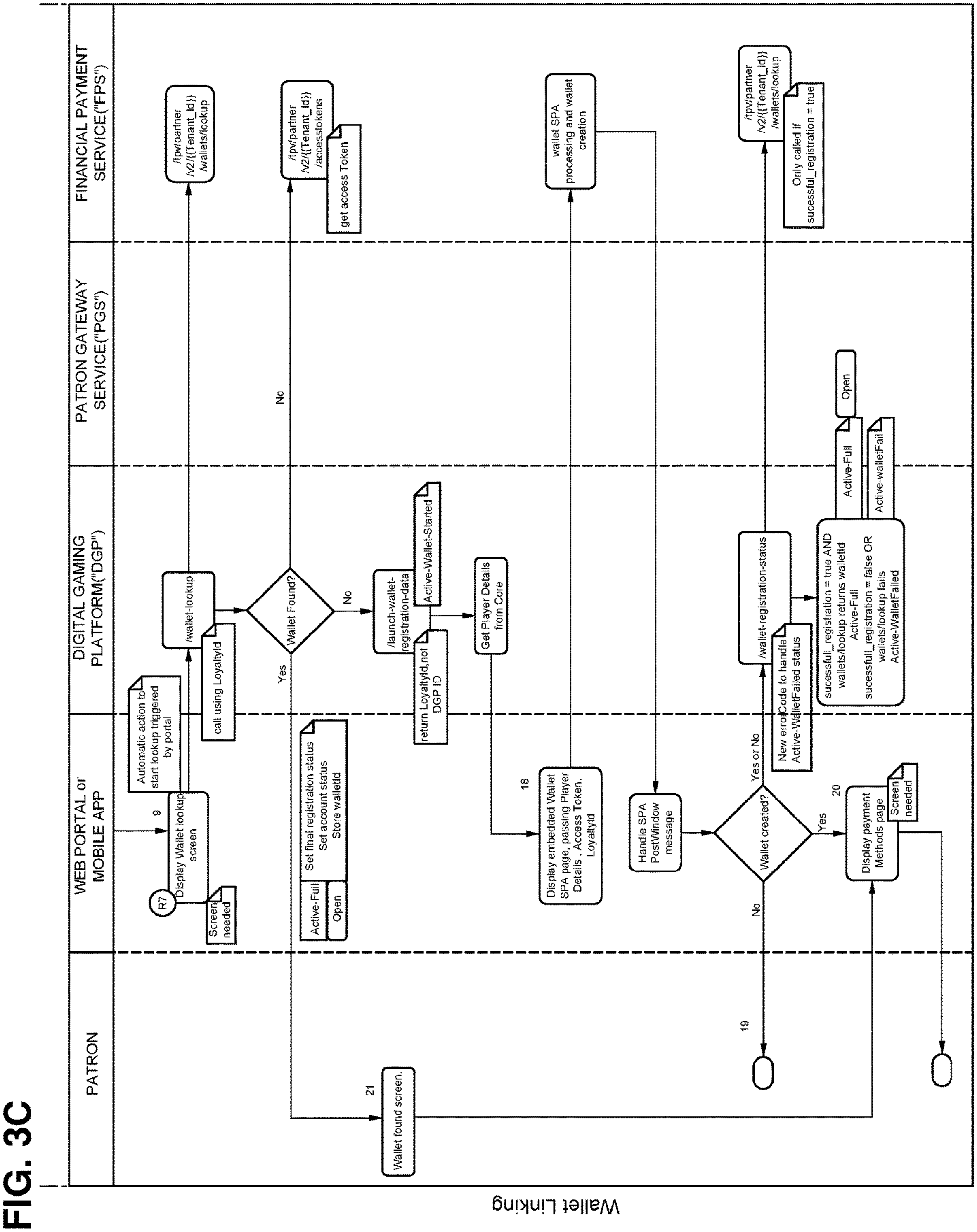

If the patron's CMS eligibility status permits, the patron's registration status may be set to "Active-Loyalty-Linked" which allows the patron to resume at this step in the registration process. (See FIG. 3C at R7). Also, the patron is informed that the Loyalty Linking steps have completed successfully and asked if they wish to proceed to the Wallet Linking steps. (See FIG. 3B at 17).

PGS Assist—Details of Registration/Enrollment—Wallet Linking

In one embodiment, as part of the registration process, the patron might elect to link an "e-wallet" or financial wallet to their account, such as for funding wagering game play. When the patron chooses to proceed with the Wallet Linking steps the DGP must communicate with the FPS. This financial system can be a paywall, a stored value account, a digital wallet, a gaming credit account or other financial account which is able to transfer funds to and from the DGP gaming system's wagering account(s).

The DGP directly communicates with the FPS via an API. At this step key information obtained from the patron in earlier steps of the registration process is used in an API call from the DGP to the FPS. This API looks for the existence of a wallet or suitable payment method belonging to the patron within the FPS. If an existing wallet or payment method is found for the patron, the DGP stores the appropriate references to the wallet or payment method for later use in funds transfers. The DGP notifies the patron their registration is complete. (See FIG. 3B at 17). Following the completion notification, the patron may be asked to make an initial funds transfer into their DGP wagering account. (See FIG. 3C at 20).

If no existing wallet or payment method is found, the DGP marshals a payload of data previously collected from the patron and the PGS. This payload typically contains the patron's name, address, DOB, ID document information, CMS information such as the player tracking card or CMS ID and may contain other data as dictated by the FPS. In this embodiment the payload is securely passed to the FPS, such as via HTTP URL redirection. The URL may be hosted by the FPS. Once redirected to this URL the patron will interact with a series of FPS web pages which may collect additional information from the patron, such as social security number and request the patron accept terms and conditions, privacy policies and marketing opt in/out choices. (See FIG. 3C at 18).

The contents of the payload and the FPS may vary in practice depending on requirements and capabilities of the FPS. For example, instead of URL redirection, some FPS may utilize APIs or other interfaces to accomplish these same objectives.

The FPS will typically perform a variety of authentication checks using the patron info provided in the payload. During account creation, a variety of cross checks will typically be conducted by the FPS to ensure the patron's name, address and social security number and other data, such as ID information, are aligned with each other. In addition, the Social Security number of the patron may be separately checked for validity.

When the patron has successfully completed the FPS pages and the payload data has been authenticated, a new FPS account may be created for the patron if an existing account was not found for them. Additionally, a wallet or payment method is created and associated with the account. A completion message is provided to DGP containing the result of the wallet or payment method creation.

Should the completion message indicate failure, the patron's registration status in DGP is set to "Active-WalletFailed." The patron is informed of this failure. (See FIG. 3C at 19).

When the DGP receives a successful completion message from the FPS, it obtains and stores the FPS references to the wallet account or payment method for operational use. The patron's registration status in DGP is set to "Active-Full" signifying successful completion of the registration process. The patron's DGP account is activated for use and the patron is notified and prompted to fund their DGP wagering account. (See FIG. 3C at 21 and 20).

From the above description it will be appreciated that in some embodiments, the DGP system is required to orchestrate all the steps in the registration process. To do so, the DGP system is required to implement APIs from two diverse systems: the PGS and the FPS system. In addition, the DGP must retain patron related fields many of which are only required for API calls with the FPS. The advantage of PGS in this flow at least relieves the DGP from having to implement proprietary CMS interfaces.

PGS Assist—Details of Registration/Enrollment—OpenID Overview

With the advent of multiple patron facing mobile applications and web sites across the gaming enterprise, operators are introducing Identity Access and Management systems ("IAM") to provide a single set of login credentials for their patrons who are using several mobile apps or the web applications offered by the operator. Most of these IAM systems preferably support the evolving OpenID standard.

While single sign on does have good potential to reduce friction for the patron, it introduces yet another related system that the providers and operators will have to integrate with newly introduced gaming systems or to existing systems that need to offer single sign on to patrons. This integration point is just another in the growing suite of related gaming apps the operator may make need to deploy.

The alternate embodiment being described here illustrates how the invention integrates with an operator's IAM system that supports OpenID, although one of ordinary skill in the art will appreciate that a variety of IAM systems may be interfaced regardless of which standards they do or do not support.

PGS Assist—Details of Registration/Enrollment—OpenID Login

In one embodiment of an enrollment process, an assumption may be made that the patron has previously registered for their CMS account via an employee-assisted transaction at a loyalty booth or perhaps via a self-service enrollment kiosk, etc. In yet another embodiment, described below, the patron does not have to pre-register for CMS. The patron can be registered via PGS as an initial step in the registration process.

In one embodiment of a method of the invention, a DGP portal or mobile app is activated when the patron clicks a login button. The DGP portal or mobile app redirects the patron to an IAM hosted URL where the patron/player is prompted to login or register for an IAM account. After the patron successfully completes their login or creates their IAM account, control is redirected back to the DGP. Along with the return of control, an access token is provided by the IAM to the DGP.

The DGP uses the provided access token to call an IAM API which returns patron profile information stored in the IAM. The DGP core uses the patron profile information to check the status of the patron within DGP. If the patron does not yet exist, the DGP core returns "HTTP Status 500: Player Not Found" to the portal or mobile app which indicates to the portal or mobile app that the DGP internal registration process should be launched for this patron.

If the patron is found to already exist, the DGP core updates key patron information provided in the patron profile by IAM into the DGP core database.

Next, the DGP core calls the PGS API to lookup the patron by their patron number or loyalty ID in the CMS. The patron number was obtained from the IAM patron profile. In this implementation, only a few key patron related fields from the CMS obtained via the PGS API are used to update the corresponding fields in DGP. These key fields would include the status of the patron's account on the CMS. This is done in order to synchronize the value of these key fields between the systems. If the patron's DGP account status is not restricted then control is returned to the mobile app or portal app and the patron can start playing. However, if the patron's CMS account status was found to be restricted or ineligible, the DGP account is set to a suspended status.

The DGP examines account statuses for any that would preclude gaming play. If any are found, control is returned to the portal or mobile app where the UI informs the patron that game play is not allowed.

If the DGP account status is "Registering", the patron had previously been in the registration process, but stopped or suspended it for some reason. The DGP may then execute the registration steps for a wallet along with checking FPS patron status. If an existing wallet is found and the Patron's FPS status is eligible, then control is returned to the portal or mobile app and the patron can begin playing.

PGS Assist—Details of Registration/Enrollment—OpenID Registration

This embodiment of the invention is a detailed method of the patron registration process supported by the PGS for performing OpenID Registration. At beginning of this flow, the portal or mobile app obtains the most recent terms and conditions and privacy policy documents via a DGP API call. The patron is prompted to review and accept them before the registration can continue.

After patron acceptance of these documents, the portal or mobile app calls the DGP registration API passing in the access token needed to use the OpenID service API. The DGP core then calls the OpenID Service API and receives back the patron profile stored in the service which contains a few key pieces of patron information.

The DGP Portal API logic executes a series of steps using the patron profile information from the IAM and data objects in the DGP system, as follows:

(1) Return control to the portal/mobile app with a specific error if a duplicate patron is found in DGP;
(2) Return control to the portal/mobile app with a specific error if the IAM patron profile data did not contain a patron identifier;
(3) If no errors were signaled in steps (1) or (2) create a DGP account and capture in DGP the key information from the IAM patron profile;
(4) Lookup the patron in CMS via the PGS Patron Lookup API and update key fields in DGP with values from CMS;
(5) Return control to the portal/mobile app if the CMS status of the patron is not eligible and set the DGP registration status accordingly;
(6) See if a wallet already exists for this patron on the FPS, if not return this information to the portal/mobile app which initiates a call to create wallet on the FPS;
(7) The portal/mobile app launches the wallet create method, typically FPS hosted SPA pages (e.g. pages or views of a single page application), via this FPS UI the patron accepts terms and conditions specific to wallet and may provide additional information such as a Social Security number;
(8) Following successful wallet creation on FPS, the portal/mobile checks the patron's status on the CMS via the PGS API: and
(9) If patron CMS status is eligible, this information is returned to the portal/mobile app, the patron is informed and can commence play.

The PGS functionality, described herein greatly simplifies implementation of the representative enrollment steps.

Thus many gaming related systems needing to implement patron registration would benefit from the PGS functionality.

PGS Assist—Mobile Application Orchestrates the Enrollment Process

In another embodiment of the invention, a mobile application may orchestrate the enrollment process with the assistance of PGS. Mobile devices provide a native application access to its hardware capabilities; cameras, microphones, geolocation coordinates and other instrumentation. By using these mobile device capabilities, a mobile application can simplify and improve the enrollment experience for the patron while also reducing or eliminating the role of the gaming operator's staff to assist the patron in completing steps in the enrollment process.

Mobile applications made available to patrons of a gaming operator would be expected to enroll a patron in the operator's critical gaming systems, such as CMS. To accomplish this, the mobile application must determine that the patron is who they claim to be and if the patron is previously enrolled in the CMS.

In making these determinations the mobile app may prompt the patron to take their own picture, a "selfie", and also prompt them to take pictures of the front and back of the patron's identity document, such as a driver's license. The identity document images may be scanned to extract descriptive fields for the patron such as name, address, date-of-birth, driver's license number, etc. The mobile app uses these extracted fields to populate the PGS patron search API request. The API reply to the search will inform the mobile application of the patrons CMS ID Number provided the search found a single unique patron. At this point in the process the mobile app may elect to use the patron's CMS ID Number to make additional PGS API calls to discover more about the patron and determine a course of action, for example the patron's tier in the operator's loyalty program and their status can be discovered and this knowledge used to shape the patron's user experience within the mobile app. The information from the additional PGS API calls allows the mobile application to remind the patron they already have an enrolled account, offer them to enroll in additional services, securely provide them credentials to use their account services or refer them to the operator's support services for specialized assistance in the case where their status may prevent them from using operator services.

Additionally, the mobile app may request the PGS to compare the patron's selfie with photographs of the patron previously captured within the CMS. Alternately the mobile application may request a 3$^{rd}$ party service compare the patron's selfie with the photograph obtained from the scan of the patron's Identity document. Following a successful photo comparison result the patron's selfie and the images of the patron's identity document can be stored in the CMS via the PGS API.

Should the PGS patron search API return no match for a patron the mobile application can infer that the patron has not been enrolled previously in the CMS. That being the case, the mobile app will present the patron an experience consistent with a new enrollment; account creation on CMS and perhaps other gaming related systems, acceptance of terms and conditions, creation of login credentials on IAM systems, KYC review and approval, oOne time verification of email or mobile numbers, creation of payment or wallet accounts with optional secure storage for payment methods such as credit and debit cards, etc.

In facilitating the patron enrollment experience, the mobile application can directly implement the interfaces with all related gaming systems required or it can rely upon the PGS to perform these interactions on its behalf. The resultant ease of mobile development and support is a material advantage of using the presented PGS invention.

PGS Active Management—Registration/Enrollment Overview

As one aspect of the invention, due to PGS capabilities that acquire and manage patron information from disparate gaming systems, the PGS can take an active role to create patron accounts in one or more of the related systems such as CMS, FPS and Compliance/CTR, as may be needed for a gaming operator's particular mix of casino systems. In this example embodiment, the PGS actively manages the FPS registration process and thus offloads complexity from a client DGP gaming system. Other gaming systems which wish to facilitate a patron registration in a different but related gaming system may utilize the method described herein.

In this example embodiment of such a method, the opening steps in the sequence are the same as a previously described embodiment up until step (5). After this point in the process, the PGS takes the steps to discover and create an FPS wallet account. First, the PGS calls the FPS to determine if a wallet already exists for this patron. If a wallet already exists for the patron, then the eligibility status of the patron on the FPS is examined and if the patron is not in an eligible status, this result is returned to the DGP and the patron's registration status in the DGP is set to a state that allows the patron to retry the registration process at a later time. The DGP correspondingly responds back to its caller portal/mobile app with the result from the FPS. If an existing wallet was found for the patron and they were in an eligible status, then the wallet account identifier provided in the FPS API response is retained by the DGP. The patron's DGP account is set to a status permitting game play, the portal or mobile app is notified the wallet exists and the patron will be able to fully access game play on the DGP system via the portal or mobile app.

In the case where no existing FPS wallet or patron account was found, the PGS marshals the patron related data for a call to FPS that will create a wallet or patron account. This assumes that the particular FPS offers a create wallet/account API call or makes available an equivalent method such as a database procedure(s) or SPA web pages hosted by the FPS. One skilled in the art will appreciate that the general process flow between participating systems described herein for API calls will be applicable to other methods such as database procedure(s) or SPA page flows, although the detailed coding will vary to accommodate these other methods.

When the API call to the FPS is successfully completed, the PGS then responds to the DGP's API call with a successful result. The DGP logs the result and sets the patron status to a state which grants the patron access to game play. Then the DGP responds correspondingly to the portal or mobile app which notifies the patron that their wallet has been successfully created.

If an FPS wallet account cannot be successfully created via the API or equivalent method, then PGS responds back to the DGP which in turn correspondingly replies to the portal or mobile app which notifies the patron of the failure. The DGP sets the status for the patron to a state that allows the patron to retry the registration process at a later time.

In this embodiment it is shown how the PGS may manage FPS account registration on behalf of the DGP. This is an exemplary process showing how PGS might perform a registration processes on behalf of other casino systems which implement the PGS interface.

For another example, the PGS may be configured to also register patrons in the CTR system used by the gaming operator if they do not already have an account. This automation could eliminate the need for an employee assisted registration at the time the patron must be paid for a large gaming win subject to tax reporting or withholding via a CTR or a TWE system. Once the patron is registered to the CTR or TWE system the friction for the patron at any later time when a taxable gaming win occurs is greatly reduced. For example, the PGS may be utilized to obtain patron information for the JX server from the casino server as described therein, for use in the taxable gaming win forms generation process as described in U.S. patent application Ser. No. 17/723,682 filed Apr. 19, 2022 (published as U.S. Pub. 2022-0343728), which is co-owned by the Applicant of this application and which is incorporated herein by reference in its entirety.

The functionality in this embodiment reduces the time and cost of integrating new gaming related systems into an enterprise. In addition, by utilizing the PGS functionality described herein, the operator's patron on-boarding practices for newly adopted systems would benefit immediately from the invention and become more standardized over time as additional systems are integrated, thus further decreasing operator costs.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A patron gateway service system for a casino, comprising:

a gateway server configured to implement a patron gateway service, the gateway server comprising:

a processor;

a memory;

a communication interface; and machine-readable code stored in the memory and configured to cause the processor to:

receive, via the communication interface, a request from a first casino system of a request to enroll a patron in the first casino system;

determine a configuration of a second casino system in which the patron has already been enrolled;

determine, based on the configuration of the second casino system, a first application program interface (API) of a set of APIs capable of interfacing with the second casino system;

transmit, via the communication interface using the first API, a request for patron information associated with the patron to the second casino system;

receive, via the communication interface using the first API, the patron information from the second casino system;

determine a configuration of the first casino system;

determine, based on the configuration of the first casino system, a second API of the set of APIs capable of interfacing with the first casino system; and transmit, via the communication interface using the second API, the patron information to the first casino system for use in enrolling the patron.

2. The patron gateway service system in accordance with claim 1, wherein the first casino system comprises an online gaming system.

3. The patron gateway service system in accordance with claim 2, wherein the second casino system comprises a casino management system.

4. The patron gateway service system in accordance with claim 2, wherein the second casino system comprises a financial payment system.

5. The patron gateway service system in accordance with claim 1, wherein the request from the first casino system includes patron identification information.

6. The patron gateway service system in accordance with claim 1, wherein the patron information comprises patron loyalty account information.

7. The patron gateway service system in accordance with claim 1, wherein the patron information comprises patron financial account information.

8. The patron gateway service system in accordance with claim 7, wherein the patron financial account information comprises information identifying an electronic wallet.

9. A casino patron management system, comprising:

a first casino system;

a second casino system;

a gateway server configured to implement a patron gateway service, the gateway server comprising:

a processor;

a memory;

a communication interface; and machine-readable code stored in the memory, wherein the gateway server is communicatively interposed between the first casino system and the second casino system;

a first application program interface (API) stored in the memory of the gateway server, said wherein the first API enables interfacing of the gateway server with the first casino system; and a second API stored in the memory of the gateway server, said wherein the second API enables interfacing of the gateway server with the second casino system, wherein the machine-readable code stored in the memory of the gateway server is configured to cause the processor thereof to:

choose the first API and the second API to exchange patron information between the first casino system and the second casino system based on a first configuration of the first casino system and a second configuration of the second casino system, and utilize the first API and the second APIs to respectively communicate with the first casino system and the second casino systems to exchange the patron information between the first casino system and the second casino systems.

10. The casino patron management system in accordance with claim 9, wherein the first casino system comprises an online gaming system.

11. The casino patron management system in accordance with claim 10, wherein the second casino system comprises a casino management system.

12. The casino patron management system in accordance with claim 10, wherein the second casino system comprises a financial payment system.

13. The casino patron management system in accordance with claim 12, wherein the gateway server is configured to receive a request from the first casino system for patron information, and wherein the request includes patron identification information.

14. The casino patron management system in accordance with claim 13, wherein the patron information comprises patron loyalty account information.

15. The casino patron management system in accordance with claim 13, wherein the patron information comprises patron financial account information.

16. The casino patron management system in accordance with claim 13, wherein the gateway server is configured to transmit a request for the patron information to the second casino system.

17. A patron gateway service system, comprising:

a server comprising:

a processor;

a memory;

a communication interface; and machine-readable code stored in the memory and configured to cause the processor to:

receive, from a first casino system via the communication interface, information regarding a patron seeking to enroll in the first casino system;

determine one or more configurations of one or more second casino systems in which the patron is already enrolled;

determine, based on the one or more configurations of the one or more second casino systems, one or more first application programming interfaces (APIs) capable of respectively interfacing with the one or more second casino systems;

transmit, via the communication interface using the one or more first APIs, a request to the one or more second casino systems for existing accounts of the patron;

receive, via the communication interface using one of the one or more first APIs, information regarding an existing patron account associated with one of the one or more second casino systems;

determine a configuration of the first casino system;

determine, based on the configuration of the first casino system, a second API capable of interfacing with the first casino system;

transmit, to the first casino system via the communication interface using the second API, the existing patron account information; and link the patron enrollment in the first casino system with the existing patron account associated with the one of the one or more second casino systems.

18. The patron gateway service system in accordance with claim 17, wherein the information regarding the existing patron account comprises a personal identification number (PIN).

19. The patron gateway service system in accordance with claim 17, wherein the first casino system comprises an online gaming system.

20. The patron gateway service system in accordance with claim 17, wherein the one of the one or more second casino systems comprises a casino patron loyalty system.

21. The patron gateway service system in accordance with claim 17, wherein the one of the one or more second casino systems comprises a casino management system.

22. The patron gateway service system in accordance with claim 17, wherein the one of the one or more second casino systems comprises a financial payment system.

* * * * *